(12) United States Patent
Saito

(10) Patent No.: US 11,287,375 B2
(45) Date of Patent: Mar. 29, 2022

(54) INSPECTION DEVICE

(71) Applicant: Hitachi High-Tech Corporation, Tokyo (JP)

(72) Inventor: Shota Saito, Minato-ku (JP)

(73) Assignee: Hitachi High-Tech Corporation, Tokyo (JP)

(*) Notice: Subject to any disclaimer, the term of this patent is extended or adjusted under 35 U.S.C. 154(b) by 0 days.

(21) Appl. No.: 17/043,995

(22) PCT Filed: Apr. 12, 2018

(86) PCT No.: PCT/JP2018/015401
§ 371 (c)(1),
(2) Date: Sep. 30, 2020

(87) PCT Pub. No.: WO2019/198201
PCT Pub. Date: Oct. 17, 2019

(65) Prior Publication Data
US 2021/0033532 A1 Feb. 4, 2021

(51) Int. Cl.
*G01N 21/47* (2006.01)
*G01B 11/30* (2006.01)
*G01N 21/95* (2006.01)

(52) U.S. Cl.
CPC ............ *G01N 21/47* (2013.01); *G01B 11/30* (2013.01); *G01N 21/9505* (2013.01); *G01N 2201/0631* (2013.01); *G01N 2201/06113* (2013.01)

(58) Field of Classification Search
CPC ............... G01N 21/47; G01N 21/9505; G01N 21/9501; G01N 21/956;
(Continued)

(56) References Cited

U.S. PATENT DOCUMENTS 5,493,123 A * 2/1996 Knollenberg ...... G01N 21/8806
250/358.1
5,978,078 A * 11/1999 Salamati-Saradh .... G01N 21/94
356/141.1
(Continued)

FOREIGN PATENT DOCUMENTS

CA 2288683 A1 * 11/1998 ............... G01V 1/44
JP 62-198738 A 9/1987
(Continued)

OTHER PUBLICATIONS

International Search Report (PCT/ISA/210) issued in PCT Application No. PCT/JP2018/015401 dated Jun. 19, 2018 with English translation (five pages).
(Continued)

*Primary Examiner* — Michael P Stafira
(74) *Attorney, Agent, or Firm* — Crowell & Moring LLP

(57) ABSTRACT

The invention aims to provide an inspection device that can sensitively detect a defect even if intensity of scattered light reflected from an inspection object greatly varies depending on portions of the inspection object. An inspection device according to the invention uses a history of detection signals to predict whether a next detection signal level exceeds a threshold. When the detection signal level is predicted to exceed the threshold, operation of the device is beforehand changed such that the detection signal level does not exceed the threshold.

10 Claims, 4 Drawing Sheets

(58) Field of Classification Search
CPC ......... G01N 2021/95676; G01N 21/94; G01N 21/95607; G01N 21/8806; G01N 21/8851; G01N 2201/103; G01N 2021/8822; G01N 2021/8825; G01N 21/95684; G01N 21/21; G01N 21/95623; G01N 2291/044; G01N 29/44; G01N 2021/8896; G01N 21/84; G01N 21/88; G01N 2021/8427; G01N 21/8901; G01N 29/043; G01N 21/45; G01N 2201/06113; G01N 2201/1045; G01N 2201/12; G01N 2021/8841; G01N 2021/8887; G01N 21/9506; G01N 21/958; G01N 2201/104; G01N 29/07; G01N 29/42; G01N 2291/011; G01N 2291/012; G01N 2021/8848; G01N 21/9503; G01N 2291/02854; G01N 29/4472; G01N 29/46; G01N 2021/8854; G01N 21/4788; G01N 21/64; G01N 21/65; G01N 21/658; G01N 2291/0289; G01N 2291/102; G01N 2291/103; G01N 2291/106; G01N 29/348; G01N 2015/149; G01N 2021/95615; G01N 21/474; G01N 2291/014; G01N 2291/0237; G01N 27/9046; G01N 29/04; G01N 29/449; G01N 2021/4711; G01N 2021/5961; G01N 2021/8627; G01N 2021/8883; G01N 21/4795; G01N 21/952; G01N 2201/0233; G01N 2201/04; G01N 2201/0683; G01N 2201/1085; G01N 29/225; G01N 29/262; G01N 29/265; G01N 29/38; G01N 29/4427; G01N 29/4463; G01N 29/50; G01N 15/14; G01N 15/1425; G01N 15/1459; G01N 15/1484; G01N 2015/1006; G01N 2021/4792; G01N 2021/8809; G01N 2021/8845; G01N 2021/8918; G01N 2033/0081; G01N 21/211; G01N 21/51; G01N 21/55; G01N 21/8422; G01N 21/9018; G01N 21/954; G01N 2201/0631; G01N 2201/10; G01N 2291/0234; G01N 2291/0238; G01N 2291/0258; G01N 2291/02845; G01N 2291/048; G01N 2291/2623; G01N 2291/2634; G01N 29/045; G01N 29/14; G01N 29/223; G01N 29/4409; G01N 33/46; G01N 15/02; G01N 2021/177; G01N 2021/4707; G01N 2021/4709; G01N 2021/8864; G01N 2021/945; G01N 2021/95638; G01N 21/01; G01N 21/1717; G01N 21/8803; G01N 21/89; G01N 2203/0051; G01N 2203/0082; G01N 2203/0094; G01N 2203/021; G01N 2203/0212; G01N 2291/0231; G01N 2291/02827; G01N 2291/0425; G01N 23/203; G01N 25/72; G01N 27/82; G01N 27/83; G01N 29/024; G01N 29/11; G01N 29/22; G01N 29/4418; G01N 29/4445; G01N 29/4454; G01N 3/40; G01B 11/30
See application file for complete search history.

(56) References Cited

U.S. PATENT DOCUMENTS

| | | | |
|---|---|---|---|
| 8,681,328 B2 * | 3/2014 | Taniguchi | G01N 21/47 356/237.2 |
| 2005/0110986 A1 * | 5/2005 | Nikoonahad | G01N 21/9501 356/237.2 |
| 2007/0019185 A1 * | 1/2007 | Hamamatsu | G01N 21/956 356/237.2 |
| 2007/0153273 A1 * | 7/2007 | Meeks | G01N 21/95607 356/369 |
| 2011/0299088 A1 | 12/2011 | Jingu et al. | |
| 2012/0274931 A1 * | 11/2012 | Otani | G01N 21/8806 356/237.3 |
| 2013/0169957 A1 * | 7/2013 | Wolf | G01N 21/00 356/237.1 |
| 2013/0278926 A1 | 10/2013 | Takahashi et al. | |
| 2014/0152986 A1 * | 6/2014 | Trainer | G01N 15/0211 356/336 |
| 2014/0233024 A1 | 8/2014 | Taniguchi et al. | |

FOREIGN PATENT DOCUMENTS

| | | | | |
|---|---|---|---|---|
| JP | 2010-217129 A | 9/2010 | | |
| JP | 2013-29438 A | 2/2013 | | |
| JP | 2013-164357 A | 8/2013 | | |
| JP | 2015-206817 A | 11/2015 | | |
| WO | WO-2005091970 A2 * | 10/2005 | ......... | G01N 15/0205 |
| WO | WO-2010098000 A1 * | 9/2010 | ............ | B82Y 35/00 |
| WO | WO 2012/090392 A1 | 7/2012 | | |

OTHER PUBLICATIONS

Japanese-language Written Opinion (PCT/ISA/237) issued in PCT Application No. PCT/JP2018/015401 dated Jun. 19, 2018 (five pages).

* cited by examiner

FIG. 4
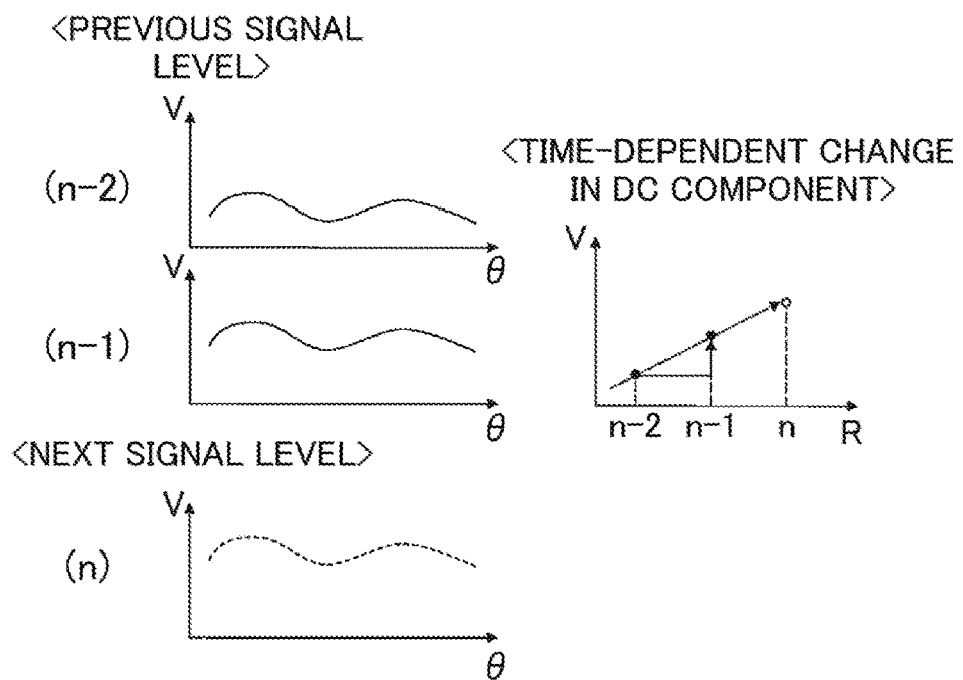
FIG. 5
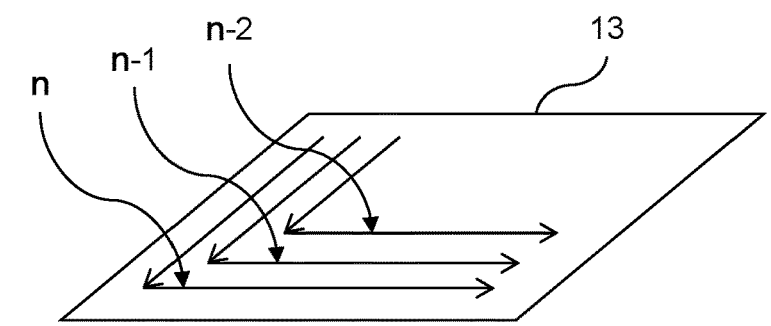
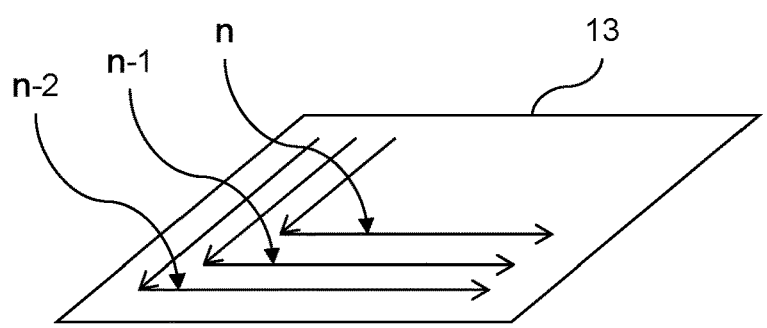

INSPECTION DEVICE

TECHNICAL FIELD

The present invention relates to an inspection device that applies light to an inspection object for inspection.

BACKGROUND ART

An optical inspection device applies illumination light to an inspection object and detects scattered light reflected from the inspection object, and thus inspects a surface state of the inspection object. When a defect exists in a portion of the inspection object, highly scattered light is detected from that portion compared with another portion. For example, if intensity of the scattered light exceeds an inspection threshold, a defect can be determined to exist in the portion.

Intensity of scattered light from a defective portion and intensity of scattered light from a normal portion can each be predicted in some degree depending on types of the inspection object. An inspection threshold is therefore beforehand set in a typical method. However, when intensity of scattered light greatly varies depending on portions of the inspection object, a defect may not be accurately detected only by a single inspection threshold. This is because a relationship between intensity of scattered light from a defective portion and intensity of scattered light from a normal portion may greatly varies depending on portions of the inspection object.

Patent literature 1 describes a technique relating to the above-described problem. The patent literature 1 aims to achieve that thresholds are set for individual regions of an inspection object so as to be different for the respective regions depending on magnitudes of noise, thereby making it possible to respond to a change in surface state and improving detection sensitivity, and discloses the following technique. That is, functions are provided, i.e., a function of setting an inspection threshold for each region and a function of setting an inspection threshold for each of a plurality of spatially independent detectors. Magnitude of noise from an inspection object varies depending on spatial directions even in the same region. Hence, maximization of an SN ratio of a detection signal and optimal threshold setting are performed by optimal signal arithmetic processing depending on magnitude of noise from the inspection object for each detector and for each region of the inspection object, thereby detection sensitivity is maximized. (Refer to a summary)

CITATION LIST

Patent Literature

Patent literature 1: Japanese Unexamined Patent Application Publication No. 2010-217129.

SUMMARY OF INVENTION

Technical Problem

The technique of patent literature 1 is intended to improve detection sensitivity by setting an optimum inspection threshold for each portion of the inspection object. However, intensity of scattered light from a defective portion may come close to the maximum detectable intensity of a detector or may exceed the maximum detectable intensity depending on a surface state of the inspection object. Such an inspection object is difficult to be subjected to accurate defect inspection only by adjusting an inspection threshold.

The invention, which has been made in light of the above-described problem, aims to provide an inspection device that can sensitively detect a defect even if intensity of scattered light reflected from an inspection object greatly varies depending on portions of the inspection object.

Solution to Problem

An inspection device according to the invention uses a history of detection signals to predict whether a next detection signal level exceeds a threshold. When the detection signal level is predicted to exceed the threshold, operation of the device is beforehand changed to prevent the detection signal level from exceeding the threshold.

Advantageous Effects of Invention

According to the inspection device of the invention, even if a detection signal level greatly varies depending on portions of an inspection object because a surface state of the inspection object greatly varies depending on the portions, a defect can be sensitively detected.

BRIEF DESCRIPTION OF DRAWINGS

FIG. 4 is a schematic illustration of a procedure, according to which the signal processing unit 16 predicts occurrence of the situation as illustrated in the bottom view of FIG. 3.

FIG. 5 exemplifies a scan path of illumination light in inspection of a rectangular inspection object 13.

DESCRIPTION OF EMBODIMENTS

First Embodiment

Figure 1:
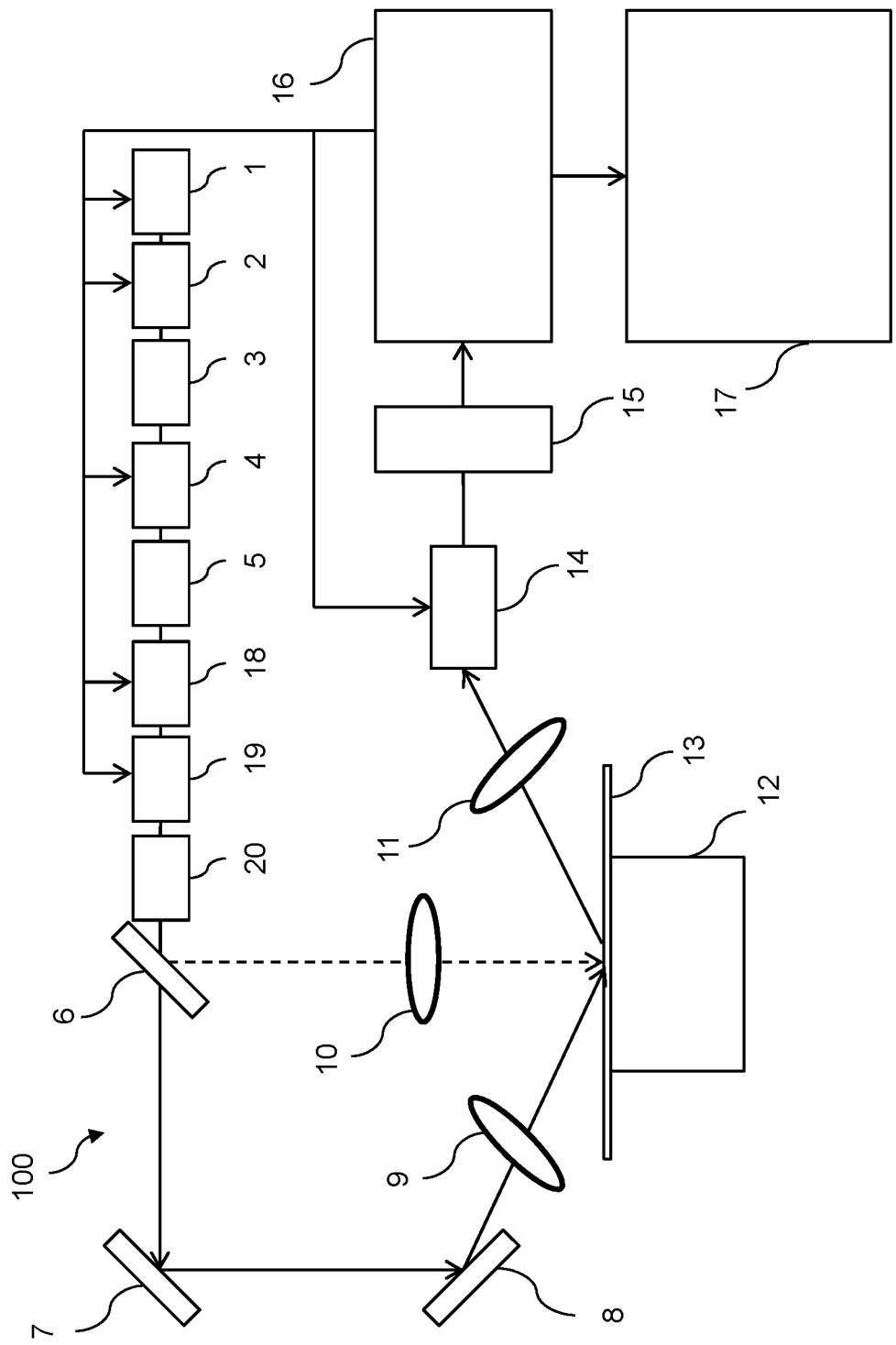
FIG. 1 is a block diagram of an inspection device 100 according to a first embodiment.

FIG. 1 is a block diagram of an inspection device 100 according to a first embodiment of the invention. The inspection device 100 irradiates an inspection object 13 with illumination light to inspect defects in the inspection object 13 or a surface state (such as surface roughness) of the inspection object 13. In this embodiment, a semiconductor wafer is exemplified as the inspection object 13. The inspection device 100 includes an illumination system, a detection unit 14, and a signal processing unit 16. The illumination system includes a set: a light source 1 to a polarizing beam splitter 20 and a set: a switching element 6 to a condensing lens 11, which are described later. The detection unit 14 and the signal processing unit 16 are specifically described later.

The light source 1 emits illumination light. The light source 1 can be configured of a solid laser, a liquid laser, or a gas laser, for example. The light source 1 emits illumination light such as ultraviolet light or visible light, for example. The light source 1 may be a continuous-wave light source or a pulse-wave light source.

A light quantity adjusting mechanism 2 is an optical component to attenuate the light quantity of the illumination light. The light quantity adjusting mechanism 2 can be configured of a combination of a neutral density filter (ND filter), a wave plate, and a polarizing beam splitter.

A magnification adjusting mechanism 3 forms illumination light into a desired beam shape. The magnification adjusting mechanism 3 can be configured of a beam expander, an anamorphic lens prism, and an objective lens, for example.

An electrooptic element 4 can change a proportion of each polarization component (p-polarization or s-polarization) of illumination light. The electrooptic element 4 can be configured of an optical element that changes polarization using Pockels effect or Kerr effect, for example.

A polarization switching element 5 adjusts the illumination light to be in a desired polarization state. The polarization switching element 5 can be configured of a wave plate and a polarizing beam splitter, for example. For example, the polarization switching element 5 adjusts the illumination light to be in a complete polarization state or a random polarization state.

A neutral density filter 18 can reduce the quantity of light regardless of a wavelength of the illumination light. Optical density (transmittance) of the neutral density filter is designed to be adjustable. A wave plate 19 can change a polarization state of the illumination light, and is a half-wavelength plate or a quarter wavelength plate, for example. The polarizing beam splitter 20 can pass or reflect light in a specific polarization state.

The switching element 6 switches an irradiation direction of the illumination light onto the inspection object 13 between perpendicular and oblique directions. The switching element 6 can be configured of a reflective mirror or a half mirror, for example. In case of using the half mirror, certain transmitted light is desired to be shielded on an optical path so as to be not applied to the inspection object 13.

Mirrors 7 and 8 adjust a course of irradiation light such that the irradiation light is obliquely applied onto the inspection object 13. Condensing lenses 9 and 10 condense the irradiation light to an irradiation position on the inspection object 13. The condensing lens 11 condenses scattered light reflected from the inspection object 13 onto the detection unit 14.

An XYZθ stage 12 is a movable stage on which the inspection object 13 is placed. The XYZθ stage 12 can move or rotate the inspection object 13 in an X or Y axis direction parallel to the surface of the inspection object 13, in a Z axis direction perpendicular to the surface of the inspection object 13, or in a θ axis direction in which the inspection object 13 is rotated about the Z axis. The inspection object 13 is moved in the Z axis direction to adjust a focal point to focus the irradiation light. The inspection object 13 is moved in the θ, X, and Y axis directions to scan the surface of the inspection object 13. A light spot applied to the surface of the inspection object 13 moves helically or concentrically from a reference position (for example, the center) to the periphery of the inspection object 13 or from the periphery to the reference position.

The detection unit 14 detects scattered light caused by irradiation of the inspection object 13 with light and coming from the inspection object 13. The detection unit 14 performs photoelectric conversion on the detected scattered light and outputs a detection signal having a signal level (for example, voltage value) indicating light intensity of the scattered light. The detection unit 14 can be configured of a photodiode or a photomultiplier, for example. An AD converter 15 converts a detection signal output by the detection unit 14 into a digital signal.

The signal processing unit 16 uses the detection signal output by the AD converter 15 to determine whether scattered light is caused by a defect or a foreign substance on the inspection object 13 or by a normal portion. For example, the signal processing unit 16 can compare intensity of the scattered light with an inspection threshold so that the scattered light is determined to be caused by a defect or a foreign substance if the intensity exceeds the inspection threshold. Furthermore, the signal processing unit 16 can determine size of the defect or foreign substance based on an irradiation area in which the intensity exceeds the inspection threshold. The signal processing unit 16 displays a determination result on a display unit 17. In addition, the signal processing unit 16 controls elements of the illumination system and the detection unit 14 to prevent a signal level of the detection signal output by the detection unit 14 from exceeding a predetermined threshold. Such control processing is specifically described later.

Figure 2:
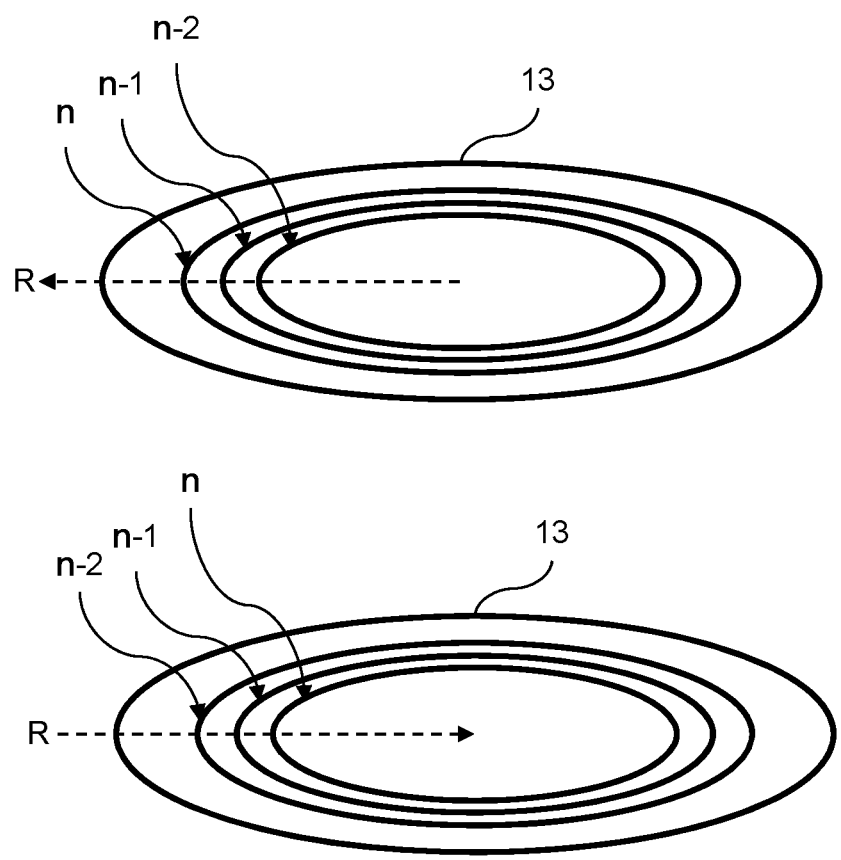
FIG. 2 is a schematic illustration of scan of an inspection position on a surface of an inspection object 13.

FIG. 2 is a schematic illustration of scan of an inspection position on the surface of the inspection object 13. An irradiation system scans an irradiation position, for example, in a concentric fashion with reference to a reference position (the center of a disc-like wafer in FIG. 2) on the surface of the inspection object 13. In case of scan from the center toward the periphery, a current scan path is defined as nth scan path, a scan path inside the nth scan path is defined as (n−1)th scan path, and a scan path inside the (n−1)th scan path is defined as (n−2)th scan path. In case of scan from the periphery toward the center, the scan paths are defined in reverse order.

Figure 3:
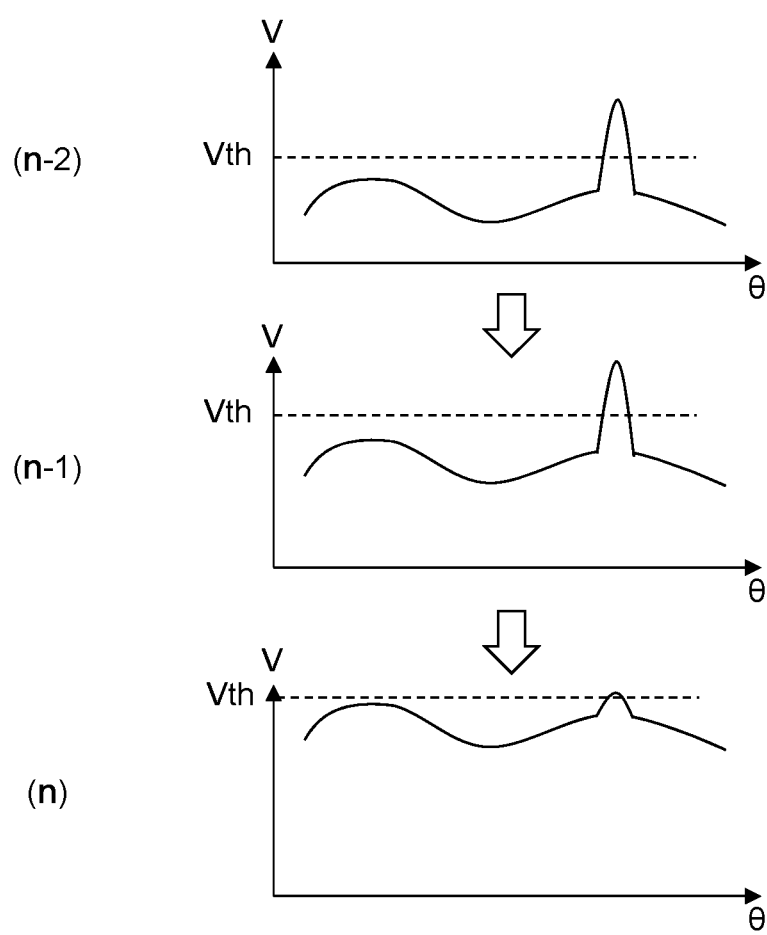
FIG. 3 exemplifies a time-dependent change in a detection signal output by a detection unit 14.

FIG. 3 exemplifies a time-dependent change in the detection signal output by the detection unit 14. FIG. 3 exemplifies respective signal levels of detection signals at the nth, (n−1)th, and (n−2)th scan paths as illustrated in FIG. 2. The horizontal axis indicates an angle corresponding to an irradiation position on a circumferential scan path, and the vertical axis indicates a signal level of the detection signal. Intensity of scattered light (i.e., a signal level of the detection signal) may generally increase with progress of scan depending on a surface state of the inspection object 13. FIG. 3 exemplifies such a case.

When the detection signal level exceeds an inspection threshold (Vth) at a portion, the signal processing unit 16 determines that the portion has a defect or a foreign substance. Hence, when the detection signal level generally increases, the inspection threshold needs to be correspondingly increased. However, if the detection signal level comes close to the upper limit of the signal level output by the detection unit 14, the signal level is saturated in the vicinity of the upper limit as illustrated in (n) of FIG. 3, making it difficult to determine whether the signal level indicates a defect or a foreign substance. In such a situation, even if the inspection threshold is increased with an increase in signal level, since a signal level of a normal portion is still similar to a signal level of a defective portion, a defect is still difficult to be identified.

FIG. 4 is a schematic illustration of a procedure, according to which the signal processing unit 16 predicts occurrence of the situation as illustrated in the bottom view of FIG. 3. The situation as illustrated in the bottom view of FIG. 3 is caused by a general increase in detection signal level. The signal processing unit 16 therefore calculates DC components of detection signal levels in previous scans, and predicts a DC component of a detection signal level in a next scan. In the case as illustrated in FIG. 4, an nth (next) DC component is predicted based on a difference between an (n−2)th DC component and an (n−1)th DC component.

When the DC component of the next detection signal level is predicted to increase in some degree, a signal level of scattered light from a defective portion is predicted to be saturated in the vicinity of the upper limit as illustrated in the bottom view of FIG. 3. In other words, a detection signal level can be predicted to necessarily increase to at least a certain signal level regardless of irradiation portions. When the DC component of the next detection signal level is predicted to increase to at least a certain signal level, therefore, the signal processing unit 16 changes operation of each function unit according to a procedure as described later such that the detection signal level is not saturated in the vicinity of the upper limit.

While the situation as illustrated in the bottom view of FIG. 3 is thus determined to occur when the DC component of the next detection signal level increases to a certain degree, the degree may be beforehand appropriately set depending on properties of the inspection object 13 or device characteristics. For example, a signal level slightly below the upper limit of a signal level output by the detection unit 14 is beforehand set as a determination threshold, and thus when the DC component of the next detection signal level is predicted to exceed the determination threshold, the situation as illustrated in the bottom view of FIG. 3 can be determined to occur.

The detection unit 14 outputs a detection signal level indicating intensity of the scattered light. When the detection signal level is predicted to be saturated in the vicinity of the upper limit, each function unit may be provably controlled to reduce intensity of the scattered light or reduce the detection signal level for the same intensity of the scattered light. To achieve this, the signal processing unit 16 adjusts the illumination system, the detection unit 14, and/or the signal processing unit 16 in the following manner.

First Embodiment: Adjustment of Detection Signal Level by Illumination System Reducing intensity of the scattered light than before makes it possible to avoid saturation of the detection signal level in the vicinity of the upper limit. Most directly, light quantity of illumination light may be reduced. Specifically, the light quantity of illumination light can be reduced by the following methods. Some or all of such methods may be used.

The signal processing unit 16 can reduce the light quantity of the illumination light to be applied to the inspection object 13 by reducing the quantity of light emitted by the light source 1. This in turn can reduce intensity of the scattered light. Similarly, the signal processing unit 16 can reduce intensity of the scattered light by increasing the quantity of light attenuated by the light quantity adjusting mechanism 2.

The signal processing unit 16 controls the electrooptic element 4 to change the proportion of each polarization component of the illumination light, and controls the polarizing beam splitter 20 to pass only a polarization component having a smaller proportion. This results in discard of some of the polarization components of the illumination light, allowing the light quantity of the illumination light to be reduced. Similarly, the signal processing unit 16 changes the polarization state of the illumination light with the wave plate 19 such that only a certain polarization state is passed through the polarizing beam splitter 20, allowing the light quantity of the illumination light to be reduced.

The signal processing unit 16 can change transmittance of the neutral density filter 18 by changing optical density of the neutral density filter 18. This allows the light quantity of the illumination light to be reduced.

First Embodiment: Adjustment of Detection Signal Level by Detection Unit 14

Instead of or in addition to changing intensity of the scattered light, detection sensitivity of the detection unit 14 can be reduced to reduce the detection signal level for the same intensity of the scattered light. Specifically, the detection sensitivity of the detection unit 14 can be reduced by the following method.

A sensor of the detection unit 14 may be configured such that photon detection sensitivity can be increased (i.e., the detection signal level can be increased for the same photon amount) by increasing a drive voltage, for example. In such a case, the signal processing unit 16 reduces the drive voltage of the sensor to reduce the detection sensitivity of the detection unit 14. Further, the detection unit 14 may amplify an electric signal by an amplification circuit when photons detected by the sensor are converted into an electric signal. The signal processing unit 16 can reduce the detection sensitivity of the detection unit 14 by reducing a gain of the amplification circuit.

First Embodiment: Adjustment of Inspection Algorithm of Signal Processing Unit Instead of or in addition to the above operation, the signal processing unit 16 can change the inspection threshold described with reference to FIG. 3. For example, the signal processing unit 16 probably somewhat reduces intensity of the scattered light and/or the detection sensitivity of the detection unit 14 and then slightly increases the inspection threshold.

The algorithm performed by the signal processing unit 16 for inspection of a defect or a foreign substance in the inspection object 13 has beforehand set internal parameters. The parameters are designed on the premise that intensity of the scattered light and the detection sensitivity of the detection unit 14 are each in a default state. Hence, when the intensity of scattered light and the detection sensitivity of the detection unit 14 are each changed from the default of the inspection device 100, results of calculating various values based on the initial parameters may each be deviated from an assumed value. When the intensity of scattered light and the detection sensitivity of the detection unit 14 are each changed from the default of the inspection device 100, therefore, the signal processing unit 16 may correct the internal parameters of the algorithm to compensate influence of such change. A parameter type and a correction degree each depend on an algorithm structure and thus are not specifically described herein.

First Embodiment: Conclusion

The inspection device 100 of the first embodiment uses the history of the detection signal levels previously output by the detection unit 14 to predict whether the detection signal level in a next scan exceeds a threshold. When the detection signal level in the next scan is predicted to exceed the threshold, the inspection device 100 changes operation of the illumination system, the detection unit 14, and/or the signal processing unit 16 to reduce the detection signal level. Consequently, even if the detection signal level generally increases with progress of scan, the detection signal level can be prevented from being saturated in the vicinity of the upper limit.

In the first embodiment, it has been described that detection signal levels at different scan paths (for example, the (n−2)th scan path and the (n−1)th scan path) for the same inspection object 13 are used to predict a detection signal level at next scan path. Instead of this, a previous detection signal level for the same type but different inspection object 13 can be used to predict a detection signal level of an inspection object 13 to be subsequently inspected. Further, when multiple inspections are performed for the same inspection object 13, a detection signal level in a previous inspection can be used to predict a detection signal level in a next inspection. In the case of using detection signal levels at different scan paths for the same inspection object 13, the next detection signal level can be advantageously predicted at a shorter inspection interval than in other cases. When the inspection object 13 is placed on the XYZθ stage 12 for first inspection, and is then temporarily removed from on the XYZθ stage 12 and then placed again for second inspection, the second inspection can be regarded to be different from the first inspection. When only an irradiation portion is changed while the inspection object 13 is placed on the XYZθ stage 12, such a case can be regarded as a case where some inspection portions are scanned in one inspection.

Second Embodiment

FIG. 5 exemplifies a scan path of illumination light in inspection of a rectangular inspection object 13. Although concentric scan with the illumination light has been described with reference to FIG. 2, the invention is not limited thereto, and a rectangular scan may be performed as illustrated in FIG. 5, for example. In such a case, if the detection signal level generally varies as away from a reference position of the inspection object 13 (or as closer to the reference position), the detection signal level in the next scan can be predicted by a method similar to that in the first embodiment. The same holds true for a case of an inspection object 13 having a shape other than the circular shape.

The first embodiment has been described with a case where a difference in DC component between the (n−2)th and (n−1)th detection signal levels is used to predict a next nth detection signal level. Instead of or in addition to this, for example, if an (n−1)th detection signal level (or a DC component thereof) is close to the upper limit, it can be predicted that the next nth detection signal level will also be close to the upper limit. This is because since the (n−1)th scan position is adjacent to the nth scan position, both the detection signal levels are assumed to be also similar to each other. Hence, for example, when a DC component of the last detection signal level exceeds a determination threshold, the signal processing unit 16 can predict that a DC component of the next detection signal level also exceeds the determination threshold.

Modifications of the Invention

The invention should not be limited to the above-described embodiments, and includes various modifications and alterations. For example, the above-described embodiments have been described in detail to clearly explain the invention, and the invention is not necessarily limited to the embodiments having all the described configurations. In addition, part of a configuration of one embodiment can be substituted for a configuration of another embodiment, and a configuration of one embodiment can be added to a configuration of another embodiment. Furthermore, a configuration of one embodiment can be added to, eliminated from, or substituted for part of a configuration of another embodiment.

In the above-described embodiment, the signal processing unit 16 can be configured of hardware such as a circuit device implementing its functions, or configured by executing software implementing its functions by an arithmetic unit such as a central processing unit (CPU).

LIST OF REFERENCE SIGNS

100 Inspection device
1 Light source
2 Light quantity adjusting mechanism
3 Magnification adjusting mechanism
4 Electrooptic element
5 Polarization switching element
6 Switching element
7, 8 Mirror
9 to 11 Condensing lens
12 XYZθ stage
13 Inspection object
14 Detection unit
15 AD converter
16 Signal processing unit
17 Display unit
18 Neutral density filter
19 Wave plate
20 Polarizing beam splitter

The invention claimed is:

1. An inspection device that irradiates an inspection object with light to inspect the inspection object, the inspection device comprising:
  an illumination system applying illumination light to the inspection object;
  a detection unit that detects scattered light caused by applying the illumination light to the inspection object and reflected from the inspection object, and outputs a detection signal indicating intensity of the scattered light; and
  a signal processing unit that calculates a state of the inspection object using the detection signal,
  wherein the signal processing unit uses a history of detection signals previously output by the detection unit to predict whether a signal level of a detection signal subsequently output by the detection unit exceeds a predetermined threshold, and
  when predicting that the signal level of the detection signal subsequently output by the detection unit exceeds the predetermined threshold, the signal processing unit changes operation of the illumination system, the detection unit, and/or the signal processing unit such that the signal level of the detection signal subsequently output by the detection unit does not exceed the predetermined threshold,
  wherein the illumination system applies the illumination light along a first path on a surface of the inspection object and applies the illumination light along a second path different from the first path,
  the detection unit outputs a first detection signal indicating intensity of the scattered light while the illumination system applies the illumination light along the first path, and outputs a second detection signal indicating intensity of the scattered light while the illumination system applies the illumination light along the second path, the signal processing unit calculates a difference between a DC component of the first detection signal and a DC component of the second detection signal, the illumination system further applies the illumination light along a third path different from both the first path and the second path, and the signal processing unit predicts based on the difference whether a signal level of a third detection signal exceeds the predetermined threshold, the third detection signal indicating intensity of the scattered light while the illumination system applies the illumination light along the third path.

2. The inspection device according to claim 1, wherein the illumination system applies the illumination light along a path, as the first path, at least a first distance away from a reference position on the surface of the inspection object, the illumination system applies the illumination light along a path, as the second path, at least a second distance away from the reference position, the second distance being different from the first distance, the illumination system applies the illumination light along a path, as the third path, at least a third distance away from the reference position, the third distance being different from both the first distance and the second distance, and The first distance, the second distance, and the third distance are in descending or ascending order.

3. The inspection device according to claim 1, further comprising a stage on which the inspection object is placed, wherein the illumination system applies the illumination light to a first portion and a second portion on a surface of the inspection object during a period from placement of the inspection object on the stage to removal of the inspection object, and the signal processing unit uses a signal level of the detection signal indicating intensity of the scattered light reflected from the first portion to predict whether a signal level of the detection signal indicating intensity of the scattered light reflected from the second portion exceeds the predetermined threshold.

4. The inspection device according to claim 1, wherein the illumination system applies the illumination light to a first portion on a surface of the inspection object, and when a signal level of the detection signal indicating intensity of the scattered light reflected from the first portion exceeds a second threshold, the signal processing unit predicts that a signal level of the detection signal indicating intensity of the scattered light reflected from the second portion different from the first portion exceeds the predetermined threshold.

5. The inspection device according to claim 1, wherein when predicting that a signal level of a detection signal subsequently output by the detection unit exceeds the predetermined threshold, the signal processing unit changes operation of the illumination system to reduce light quantity of the illumination light to be applied to the inspection object.

6. The inspection device according to claim 5, wherein the illumination system comprises at least one of the following parts:

a light source emitting the illumination light, a light quantity adjusting mechanism adjusting light quantity of the illumination light by attenuating the illumination light emitted by the light source, an optical element that changes a proportion of each polarization component of the illumination light and extracts a selected polarization component, a neutral density filter having variable optical density and attenuating light quantity of the illumination light, and a wave plate that changes a polarization state of the illumination light, wherein the signal processing unit changes operation of the light source, the light quantity adjusting mechanism, the optical element, the neutral density filter, and/or the wave plate and thus reduces the light quantity of the illumination light to be applied to the inspection object.

7. The inspection device according to claim 1, wherein the detection unit includes a sensor that detects photons reflected from the inspection object to detect the scattered light, and the signal processing unit reduces detection sensitivity of the sensor when predicting that a signal level of a detection signal subsequently output by the detection unit exceeds the predetermined threshold.

8. The inspection device according to claim 7, wherein the sensor outputs an output signal corresponding to amount of the detected photons, and the signal processing unit reduces a gain of the output signal corresponding to the photon amount and thus reduces detection sensitivity of the sensor.

9. The inspection device according to claim 1, wherein when a signal level of the detection signal exceeds an inspection threshold, the signal processing unit determines that the inspection object has a defect at a portion irradiated with the illumination light, and the signal processing unit increases the inspection threshold when predicting that the signal level of the detection signal subsequently output by the detection unit exceeds the predetermined threshold.

10. The inspection device according to claim 1, wherein the signal processing unit determines whether the inspection object has a defect according to a predetermined algorithm, and when changing operation of the illumination system, the detection unit, and/or the signal processing unit, the signal processing unit changes an internal parameter of the algorithm to correct a calculation result varying with such a change.

\* \* \* \* \*